United States Patent
Katou (10) Patent No.: US 9,520,734 B2
(45) Date of Patent: Dec. 13, 2016

(54) CONTROL APPARATUS

(71) Applicant: DENSO CORPORATION, Kariya, Aichi-pref. (JP)

(72) Inventor: Hirotsugu Katou, Hekinan (JP)

(73) Assignee: DENSO CORPORATION, Kariya (JP)

( * ) Notice: Subject to any disclaimer, the term of this patent is extended or adjusted under 35 U.S.C. 154(b) by 345 days.

(21) Appl. No.: 14/281,993

(22) Filed: May 20, 2014

(65) Prior Publication Data

US 2014/0354054 A1  Dec. 4, 2014

(30) Foreign Application Priority Data

May 29, 2013  (JP) .................. 2013-112904

(51) Int. Cl.
*H02J 3/38* (2006.01)
*H02J 7/00* (2006.01)
*B60L 3/00* (2006.01)
*B60L 3/12* (2006.01)
*B60L 11/18* (2006.01)

(52) U.S. Cl.
CPC ............... *H02J 7/0068* (2013.01); *B60L 3/00* (2013.01); *B60L 3/12* (2013.01); *B60L 11/1853* (2013.01); *B60L 11/1861* (2013.01); *H02J 7/0029* (2013.01); *H02J 7/0057* (2013.01); *B60L 2240/547* (2013.01); *B60L 2250/16* (2013.01); *Y02T 10/7005* (2013.01); *Y02T 10/705* (2013.01); *Y02T 10/7044* (2013.01); *Y10T 307/50* (2015.04)

(58) Field of Classification Search
CPC ...................................................... H02J 3/38

USPC ........................................................ 307/43
See application file for complete search history.

(56) References Cited

U.S. PATENT DOCUMENTS 5,719,559 A * 2/1998 Talbott ................. G05B 19/048
                                                           318/565
6,137,193 A * 10/2000 Kikuoka .............. H01H 47/002
                                                           307/137

(Continued)

FOREIGN PATENT DOCUMENTS

JP       2000-134707 A    5/2000
JP       2003-209907 A    7/2003

(Continued)

*Primary Examiner* — Rexford Barnie
*Assistant Examiner* — Joseph Inge
(74) *Attorney, Agent, or Firm* — Posz Law Group, PLC (57) ABSTRACT

A control apparatus is used for a power-supply apparatus with power-supply systems connected in parallel between a pair of power wires connected to a load. Each power-supply system has a series circuit of a battery and a contact of a relay. When the control apparatus determines that at least one relay suffers from a contact welding, the control apparatus performs a battery charge/discharge process to charge/discharge the batteries through the pair of power wires by turning ON one of possible relays while turning OFF the others of the possible relays. The possible relay is defined as having a possibility of suffering from the contact welding. After the battery charge/discharge process, the control apparatus identifies which possible relay actually suffers from the contact welding based on a change in a state of the battery connected in series with the contact of each possible relay.

9 Claims, 8 Drawing Sheets (56) References Cited

U.S. PATENT DOCUMENTS

| | | | | |
|---|---|---|---|---|
| 2002/0057015 A1* | 5/2002 | Kikuta | ............... | B62D 5/0457 |
| | | | | 307/10.1 |
| 2002/0060894 A1* | 5/2002 | Horibata | ........... | H03K 17/0824 |
| | | | | 361/100 |
| 2004/0061503 A1* | 4/2004 | Morimoto | ............... | B60K 6/28 |
| | | | | 324/418 |
| 2005/0063114 A1* | 3/2005 | Suhara | .................... | G05B 9/03 |
| | | | | 361/62 |
| 2005/0270720 A1* | 12/2005 | Johnson | ............ | G01R 31/3278 |
| | | | | 361/170 |
| 2006/0021098 A1* | 1/2006 | Tezuka | ................ | H01H 47/002 |
| | | | | 477/7 |
| 2010/0296204 A1* | 11/2010 | Ichikawa | .............. | B60K 6/445 |
| | | | | 361/15 |

FOREIGN PATENT DOCUMENTS

| | | |
|---|---|---|
| JP | 2005-327562 A | 11/2005 |
| JP | 2008-154439 A | 7/2008 |
| JP | 2014-093806 A | 5/2014 |
| WO | 2011/158088 A2 | 12/2011 |

* cited by examiner

CONTROL APPARATUS

CROSS REFERENCE TO RELATED APPLICATION

This application is based on Japanese Patent Application No. 2013-112904 filed on May 29, 2013, the contents of which are incorporated herein by reference.

FIELD

The present disclosure relates to a control apparatus for a power-supply apparatus including multiple power-supply systems connected in parallel.

BACKGROUND

In recent years, a motor-powered vehicle has been in practical use. The motor-powered vehicle is a vehicle capable of running with a motor driven by electric power supplied from a battery. An example of the motor-powered vehicle includes a hybrid vehicle (HV), an electric vehicle (EV), and a fuel cell vehicle (FCV). In a drive system employed in such a motor-powered vehicle, a main relay is interposed between a battery and a power converter. In such a drive system, there is a need to detect contact welding in the main relay and to produce an alarm when the contact welding is detected.

JP-A-2012-5174 corresponding to WO2011-158088 discloses a technique for detecting contact welding in a structure where multiple batteries are connected in series, and a main relay is connected in series to each of positive and negative terminals of each battery. In JP-A-2012-5174, an electronic control unit (ECU) turns OFF one main relay while turning ON the other main relays in order to detect whether the one main relay suffers from contact welding. The one main relay is hereinafter referred to as the "target main relay". If the target main relay suffers from contact welding, an input voltage to a power converter increases. The ECU detects whether each main relay suffers from contact welding by in turn changing the target main relay.

In some cases, multiple batteries having the same nominal voltage and capacity are connected in parallel to increase the total battery capacity. In such a case, it is impossible to detect whether the target main relay suffers from contact welding by turning OFF the target main relay while turning ON the other main relays in a manner as described in JP-A-2012-5174. Therefore, if there is a possibility that any one of the main relays suffers from contact welding, all the main relays need to be replaced with new ones.

SUMMARY

In view of the above, it is an object of the present disclosure to provide a control apparatus for identifying a main relay suffering from contact welding in a power-supply apparatus including multiple power-supply systems, each of which has a main relay, connected in parallel.

According to an aspect of the present disclosure, a control apparatus is used for a power-supply apparatus which includes power-supply systems connected in parallel between a pair of power wires connected to an electrical load. Each power-supply system has a series circuit of a battery and a contact of a main relay provided for the battery. The control apparatus includes a controller for determining whether at least one of the main relays suffers from a contact welding. When the controller determines that the at least one of the main relays suffers from the contact welding, the controller performs a battery charge/discharge process to charge/discharge the batteries through the pair of power wires by turning ON one of possible main relays out of the main relays while turning OFF the others of the possible main relays. Each possible main relay is defined as having a possibility of suffering from the contact welding. After the battery charge/discharge process, the controller performs an identification process to identify which possible main relay actually suffers from the contact welding based on a change in a state of the battery connected in series with the contact of each possible main relay.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings, in which the same characters refer to the same or corresponding parts. Throughout the embodiments, the expression "contact welding occur(s) in . . . " and the expression "suffer(s) from contact welding" have the same meaning.

First Embodiment

Figure 1:
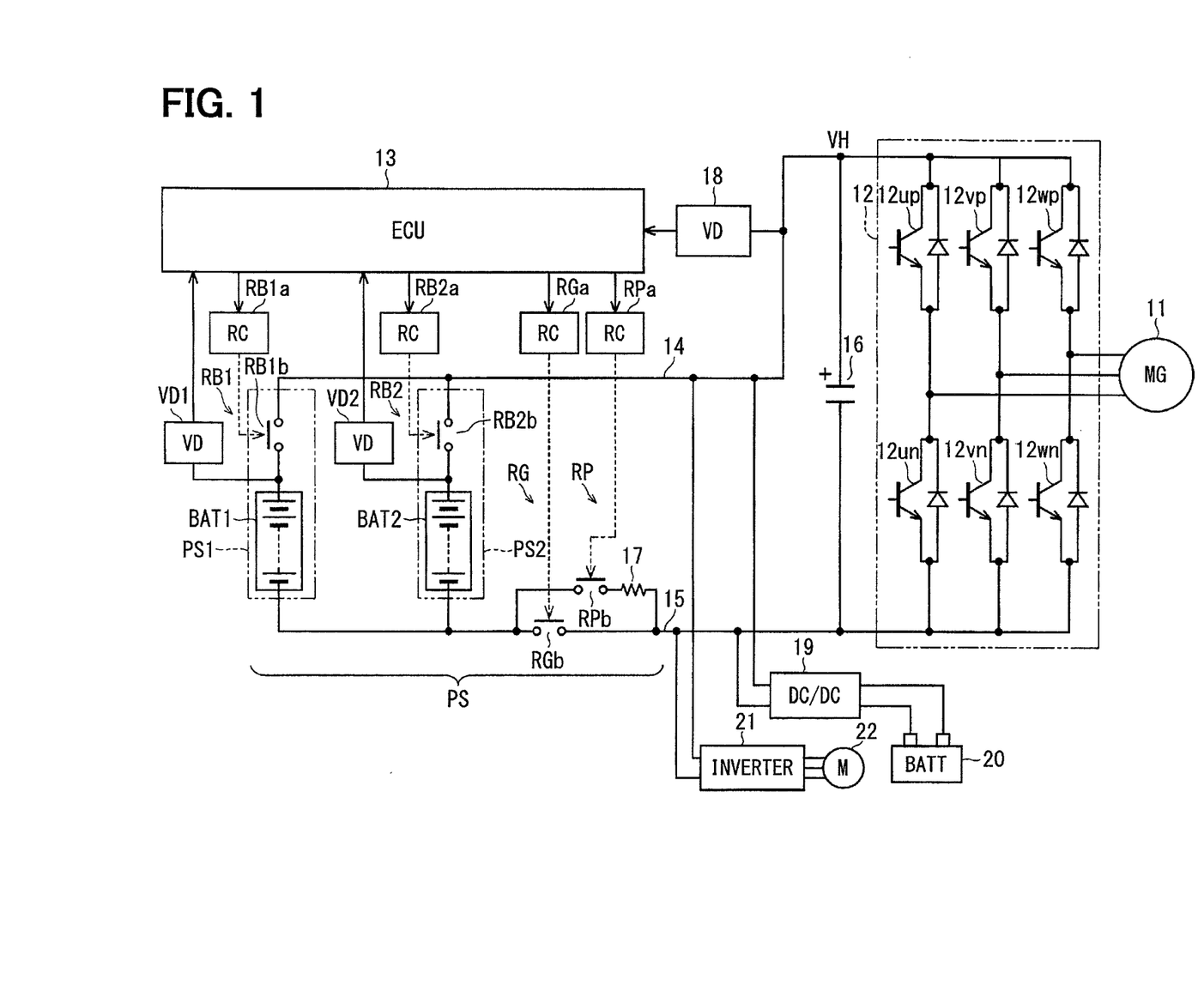
FIG. 1 is a diagram illustrating a structure of a main circuit of a power drive system according to a first embodiment of the present disclosure.

A first embodiment of the present disclosure is described below with reference to FIGS. 1-6. FIG. 1 illustrates a structure of a main circuit of a power drive system employed in a motor-driven vehicle capable of running on a motor-generator (MG) 11. An example of the motor-driven vehicle can include a hybrid vehicle (HV), an electric vehicle (EV), and a fuel-cell vehicle (FCV).

The MG 11 is driven by an inverter 12. The inverter 12 has transistors 12up, 12vp, 12wp, 12un, 12vn, and 12wn which are connected in a three phase bridge configuration. The inverter 12 is an electrical load for batteries BAT1 and BAT2. The inverter 12 performs a switching operation in accordance with a drive signal supplied from an electronic control unit (ECU) 13. Thus, the inverter 12 converts direct-current (DC) power, which is supplied through a pair of power wires 14 and 15, to alternating-current (AC) power and outputs the AC power to the MG 11. Further, the inverter 12 is capable of converting AC power, which is generated by the MG 11, to DC power and changes the battery BAT1 and BAT2 with the DC power.

A power source PS for supplying DC power is connected between the positive power wire 14 and the negative power wire 15. The power source PS includes two power systems PS1 and PS2 which are connected in parallel to increase power capacity. A capacitor 16 is connected between the power wires 14 and 15 to reduce voltage variations.

The power system PS1 includes a series circuit of a contact RB1b of a system main relay RB1 and the battery BAT1. The power system PS2 includes a series circuit of a contact RB2b of a system main relay RB2 and the battery BAT2. The contact RB1b is closed when a coil RB1a of the relay RB1 is energized, and the contact RB2b is closed when a coil RB2a of the relay RB2 is energized. For example, the batteries BAT1 and BAT2 can be secondary batteries, such as lithium-ion batteries and nickel-metal hydride batteries, and have the same nominal voltage and capacity.

A contact RGb of a common system main relay RG is provided in the power wire 15 between the capacitor 16 and the power systems PS1 and PS2. The relay RG connects and disconnects the power systems PS1 and PS2 to and from electrical loads. A series circuit of a resistor 17 and a contact RPb of a pre-charge relay RP is connected in parallel to the contact RGb. The contact RGb is closed when a coil RGa of the relay RG is energized, and the contact RPb is closed when a coil RPa of the relay RP is energized. The relay RG, the relay RP, and the resistor 17 are included in the power source PS.

Voltage detectors VD1 and VD2 detect DC voltages of the batteries BAT1 and BAT2, respectively, and output the detected voltages to the ECU 13. A voltage detector 18 detects a voltage VH between the power wires 14 and 15 and outputs the detected voltage VH to the ECU 13. A DC/DC converter 19 is an electrical load for charging a 12-volt battery 20 by stepping down the voltage VH between the power wires 14 and 15. An inverter 21 is an electrical load for driving a motor 22 for a compressor of an air conditioner.

The ECU 13 includes a microcomputer having a CPU, a volatile memory (e.g., RAM), a non-volatile memory (e.g., ROM, flash memory), a communication interface (I/F), an A/D converter, and an input/output port. Control programs for driving and controlling the MG 11, the relay RB1, the relay RB2, the relay RG, the relay RP, and the DC/DC converter 19 are stored in the non-volatile memory.

Next, operations of the first embodiment are described. The ECU 13 drives the MG 11 and the DC/DC converter 19 in accordance with the control programs. Further, the ECU 13 performs a contact welding detection process shown in FIG. 2 to identify which of the relay RB1, the relay RB2, the relay RG, and the relay RP suffers from contact welding. If the contact welding occurs, a relay contact remains closed and cannot be opened even when a corresponding relay coil is de-energized. The contact welding detection process is part of the control programs.

In the following explanation and FIGS. 2-6, turning ON the relays RB1, RB2, RG, and RP means energizing the coils RB1a, R32a, RGa, and RPa, respectively. When the relays RB1, RB2, RG, and RP are turned ON, the contacts RB1b, RB2b, RGb, and RPb are closed, respectively. In normal conditions where none of the contacts RB1b, RB2b, RGb, and RPb suffers from the contact welding, when the relays RB1, RB2, RG, and RP are turned OFF, the contacts RB1b, RB2b, RGb, and RPb are opened, respectively. In abnormal conditions where at least one of the contacts RB1b, RB2b, RGb, and RPb suffers from the contact welding, even when the relays RB1, RB2, RG, and RP are turned OFF, the at least one of the contacts RB1b, RB2b, RGb, and RPb remains closed, respectively.

The contact welding detection process is described below. In the following description, time in parentheses followed by a step number indicates time shown in FIGS. 3 and 4.

Figure 2:
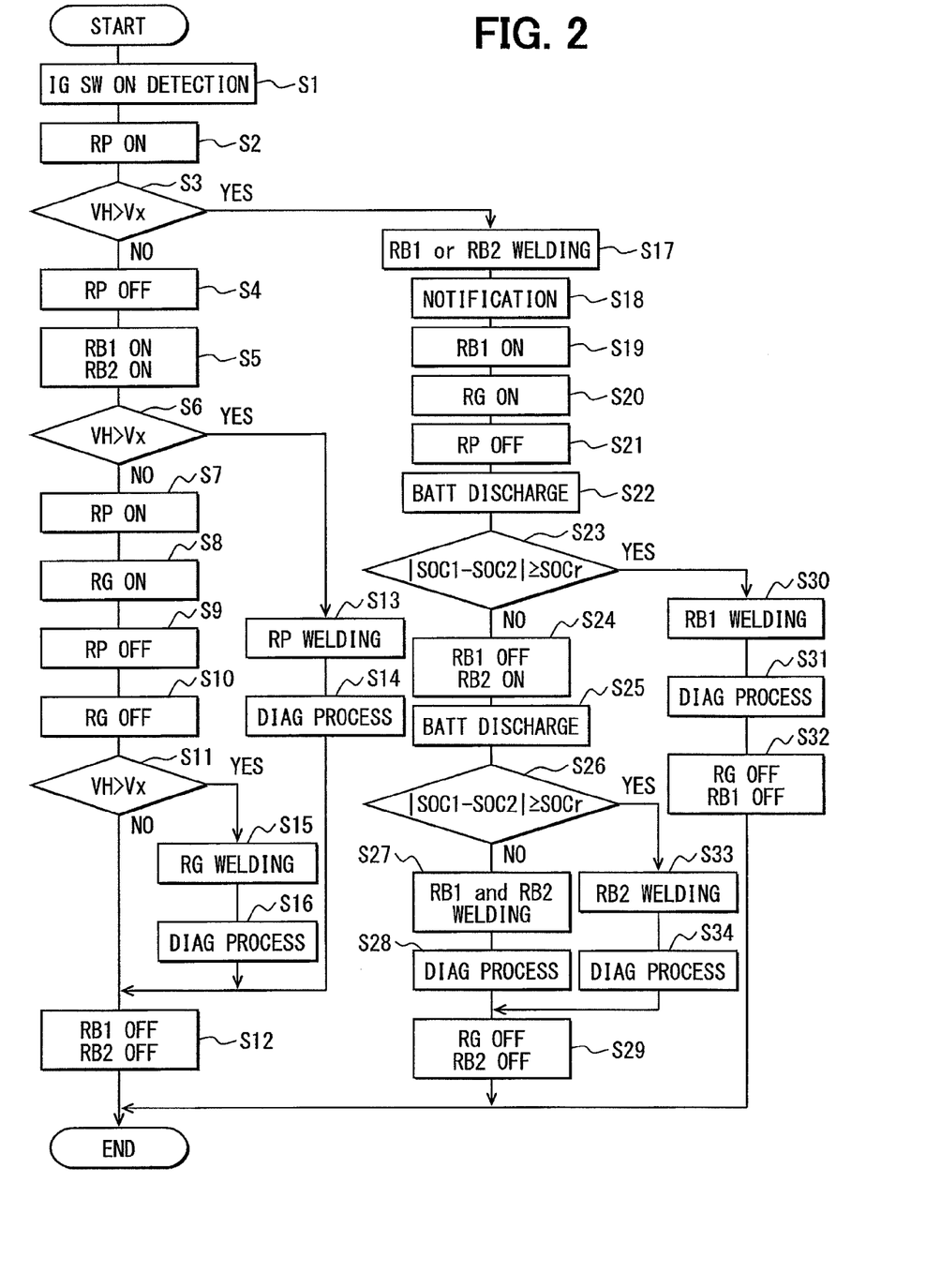
FIG. 2 is a flowchart of a contact welding detection process according to the first embodiment.

When the ECU 13 detects at S1 (t1, t11) that an ignition switch of the vehicle is turned ON, the contact welding detection process proceeds to S2 under a condition that it was determined that none of the relays RB1, RB2, RG, and RP suffers from the contact welding when the last contact welding detection process was ended.

At S2 (t1, t11), the ECU 13 turns ON the relay RP. Then, the contact welding detection process proceeds to S3 where the ECU 13 compares the voltage VH between the power wires 14 and 15 with a threshold voltage Vx. The threshold voltage Vx is a reference voltage used to determine whether the capacitor 16 is charged.

If the ECU 13 determines that the voltage VH is not greater than the threshold voltage Vx corresponding to NO at S3, the contact welding detection process proceeds to S4. In this case, neither the relay RB1 nor the relay RB2 suffers from the contact welding. Below, detection of contact welding in the relays RP and RG is described with further reference to FIG. 3.

Figure 3:
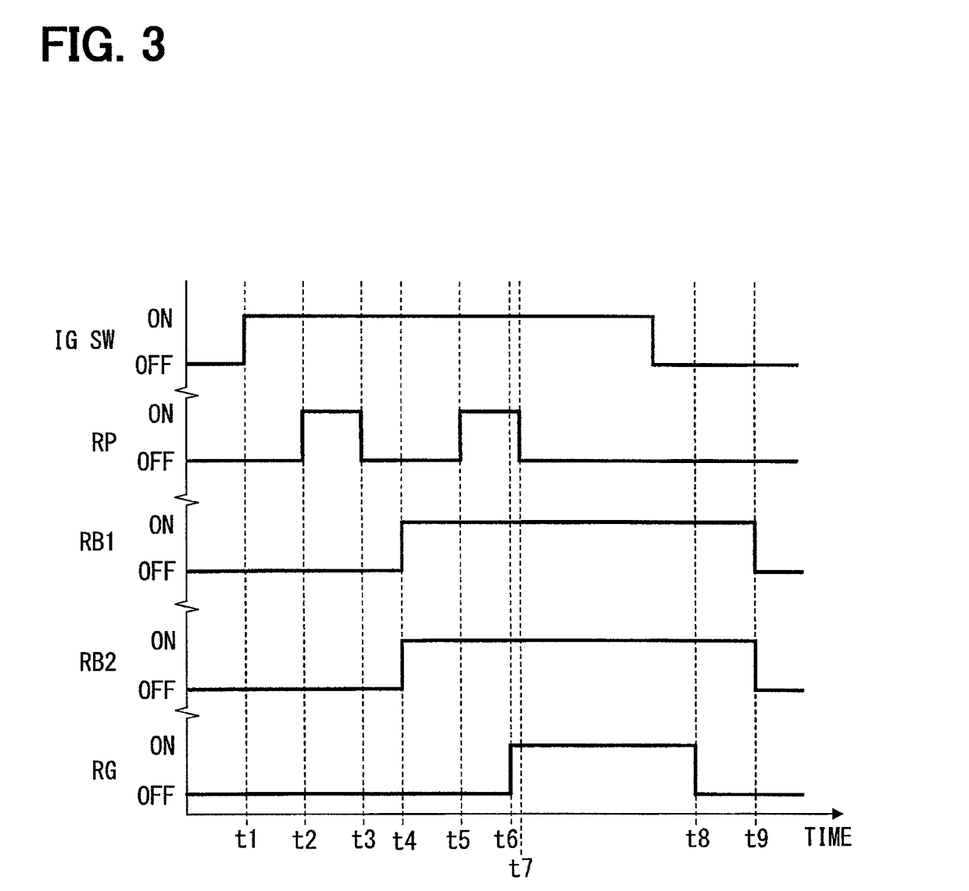
FIG. 3 is a timing chart observed when contact welding in relays RP, RG is determined.

At S4 (t3), the ECU 13 turns OFF the relay RP. Then, at 55 (t4), the ECU 13 turns ON the relays RB1 and R62. Then, at S6, the ECU 13 compares the voltage VH with the threshold voltage Vx. If the ECU 13 determines that the voltage VH is greater than the threshold voltage Vx corresponding to YES at S6, the contact welding detection process proceeds to S13.

In this case, either the relay RP or the relay RG suffers from the contact welding. However, as of the start of the contact welding detection process, none of the relays RB1, RB2, RG, and RP has suffered contact welding, and the relay RG has never been turned ON or OFF until now. Therefore, there is no possibility that the relay RG suffers from the contact welding.

Therefore, at S13, the ECU 13 determines that the relay RP suffers from the contact welding. Then, at S14, the ECU 13 performs a diagnostic process based on a diagnosis that the relay RP suffers from the contact welding. For example, the diagnostic process can include adding the diagnosis to a diagnostic history and cautioning a user about the diagnosis, for example, by illuminating a warning lamp or by sounding an audible alarm. In this case, the contact welding detection process proceeds to S12 without the MG 11 being driven. At 812, the ECU 13 turns OFF the relays RB1 and RB2, and then the contact welding detection process is ended.

If the ECU 13 determines that the voltage VH is not greater than the threshold voltage Vx corresponding to NO at 86, the contact welding detection process proceeds to S7. In this case, none of the relays RB1, RB2, RP, and RG suffers from the contact welding. Therefore, in preparation for starting to drive the MG 11, at S7 (t5), the ECU 13 turns ON the relay RP, thereby charging the capacitor 16 while preventing inrush current. After the capacitor 16 is charged, the ECU 13 turns ON the relay RG at S8 (t6) and then turns OFF the relay RP at S9 (t7). After S9, the ECU 13 outputs the drive signal to the inverter 12, thereby driving the MG 11.

If the ignition switch is turned OFF, the contact welding detection process proceeds to S10 (t8) where the ECU 13 turns OFF the relay RG. Then, after the ECU 13 discharges the capacitor 16, for example, by causing the inverter 12 to perform a predetermined energization which produces no rotating magnetic field, the contact welding detection process proceeds to S11 where the ECU 13 compares the voltage VH with the threshold voltage Vx. If the ECU 13 determines that the voltage VH is not greater than the threshold voltage Vx corresponding to NO at S11, the contact welding detection process proceeds to S12. In this case, neither the relay RP nor the relay RG suffers from the contact welding.

In contrast, if the ECU 13 determines that the voltage VH is greater than the threshold voltage Vx corresponding to YES at S11, the contact welding detection process proceeds to S15. In this case, the ECU 13 determines that the relay RG suffers from the contact welding. Then, at S16, the ECU 13 performs a diagnostic process based on a diagnosis that the relay RG suffers from the contact welding in the same manner as at S14. Then, the contact welding detection process proceeds to S12 (t9). At S12, the ECU 13 turns OFF the relays RB1 and RB2, and then the contact welding detection process is ended.

Figure 4:
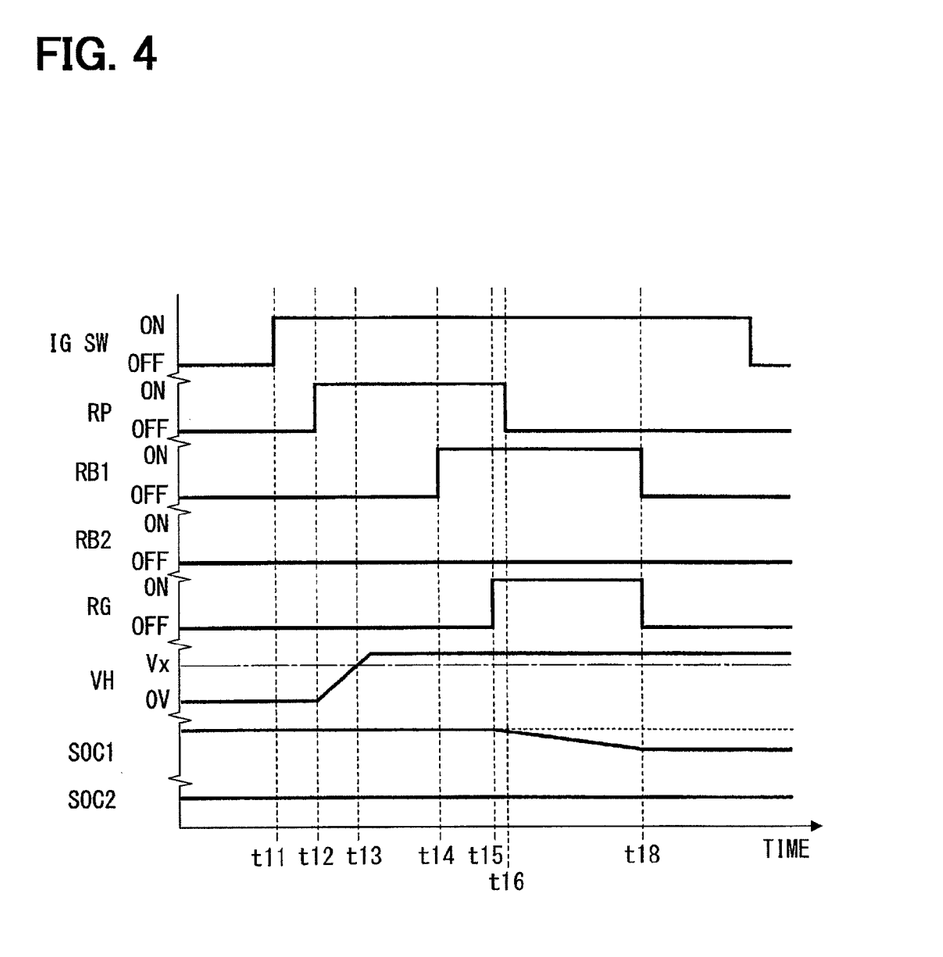
FIG. 4 is a timing chart observed when contact welding in relays RB1, RB2 is determined and when contact welding in the relay RB1 is detected.
Figure 5:
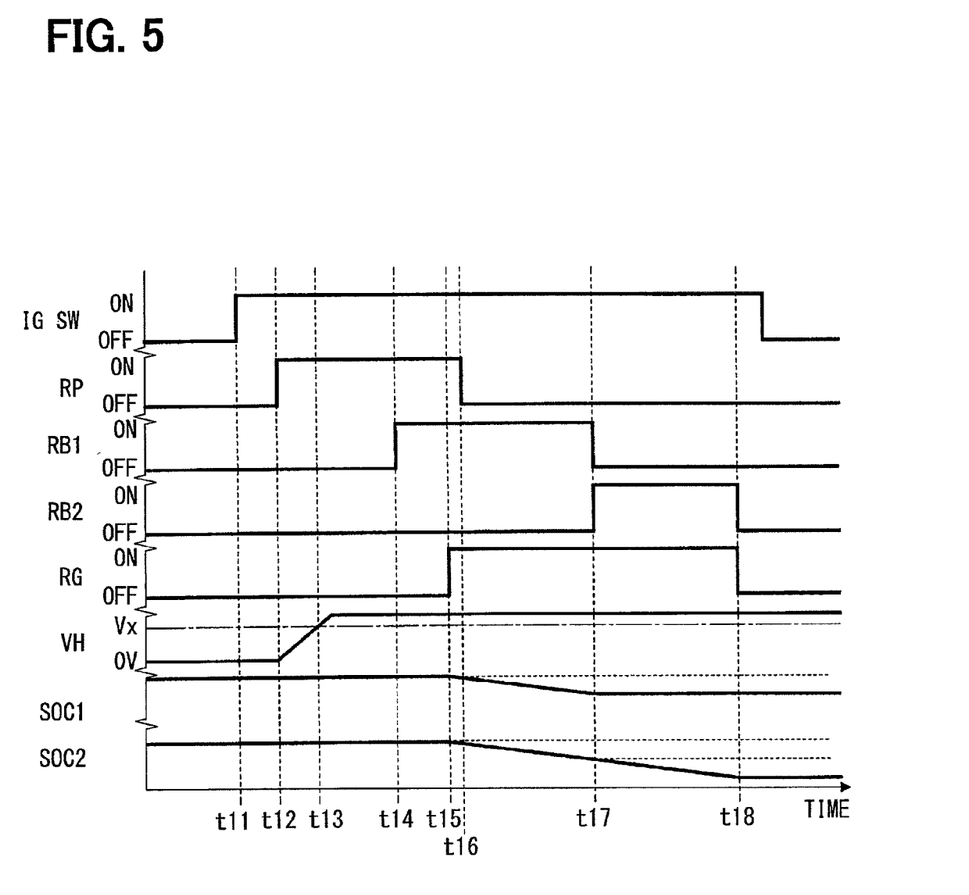
FIG. 5 is a timing chart observed when contact welding in relays RB1, RB2 is determined and when contact welding in the relay RB2 is detected.
Figure 6:
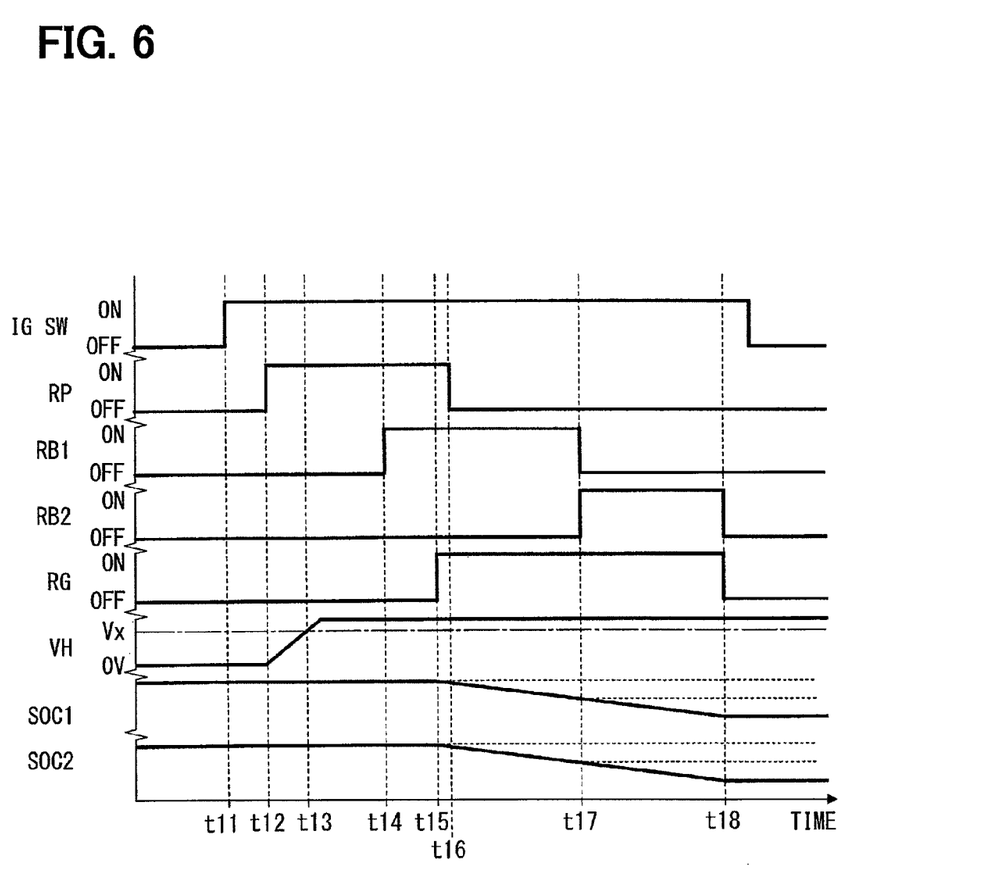
FIG. 6 is a timing chart observed when contact welding in relays RB1, RB2 is determined and when contact welding in the relays RB1 and RB2 is detected.

Next, detection of contact welding in the relays RB1 and RB2 is described with further reference to FIGS. 4-6. If the ECU 13 determines that the voltage VH is greater than the threshold voltage Vx corresponding to YES at S3, the contact welding detection process proceeds to S17. In examples shown in FIGS. 4-6, the voltage VH exceeds the threshold voltage Vx at a time t13. In this case, the relays RB1 and RB2 included in the power systems PS1 and PS2 are turned OFF, and the pre-charge relay RP is turned ON. The fact that the voltage VH exceeds the threshold voltage Vx under this condition means that the relay RB1 or the relay RB2 suffers from the contact welding.

At S17, the ECU 13 determines that the relay RB1 or the relay RB2 suffers from the contact welding. Then, at S18, the ECU 13 cautions a user about a diagnosis that the relay RB1 or the relay RB2 suffers from the contact welding, for example, by illuminating a warning lamp or by sounding an audible alarm. However, the diagnosis is not added to a diagnostic history at S18, because the relay suffering contact welding has not been identified yet. The ECU 13 identifies which of the relays RB1 and RB2 suffer from the contact welding after S19.

Specifically, at S19 (t14), the ECU 13 turns ON the relay RB1 while keeping the relay RB2 OFF. Then, in preparation for performing a battery discharge through the power wires 14 and 15, the ECU 13 turns ON the relay RG at S20 (t15) and turns OFF the relay RP at S21 (t16). Then, at S22, the ECU 13 performs the battery discharge.

When the vehicle runs, the ECU 13 performs the battery discharge by outputting the drive signal to the inverter 12, thereby driving the MG 11. In contrast, when the vehicle does not run, the ECU 13 performs the battery discharge by driving the DC/DC converter 19, thereby charging the battery 20 by causing an air-conditioner ECU (not shown) to output a drive signal to the inverter 21, thereby driving the motor 22. Alternatively, even when the vehicle runs, the ECU 13 performs the battery discharge by charging the battery 20 or by driving the motor 22.

Since the batteries BAT1 and BAT2 are connected in parallel to each other, a state of the battery BAT1 is almost equal to a state of the battery BAT2 before the battery discharge is started. According to the first embodiment, the state is a state of charge (SOC). The SOC of the battery BAT1 is hereinafter referred to as the "SOC1", and the SOC of the battery BAT2 is hereinafter referred to as the "SOC2".

After S22, the contact welding detection process proceeds to S23 where the ECU 13 determines whether an absolute value of a difference between the SOC1 and the SOC2 is not less than a threshold value SOCr. Since the relay RB1 is turned ON at S19, the battery BAT1 is surely discharged. On the other hand, since the relay RB2 is kept OFF, the battery BAT2 is not discharged unless the relay RB2 suffers from the contact welding. Therefore, if the relay RB2 does not suffer from the contact welding, the battery BAT1 is discharged without the battery BAT2 being discharged, so that the absolute value of the difference between the SOC1 and the SOC2 is not less than the threshold value SOCr.

If the ECU 13 determines that the absolute value of the difference between the SOC1 and the SOC2 is not less than the threshold value SOCr corresponding to YES at S23, the contact welding detection process proceeds to S30 where the ECU 13 determines that the relay RB2 does not suffer from the contact welding. In other words, at S30, the ECU 13 determines that the relay RB1 suffers from the contact welding. FIG. 4 shows this case. Then, the ECU 13 performs a diagnostic process at S31 and turns OFF the relays RG and RB1 at S32 (t18). After S32, the contact welding detection process is ended.

If the ECU 13 determines that the absolute value of the difference between the SOC1 and the SOC2 is less than the threshold value SOCr corresponding to NO at S23, the contact welding detection process proceeds to S24. In this case, although the relay RB2 suffers from the contact welding, whether or not the relay RB1 suffers from the contact welding cannot be determined. Therefore, the ECU 13 turns ON the relay RB2 instead of the relay RB1 at S24 (t17) and performs a battery discharge at S25 in the same manner as at S22. Since both the batteries BAT1 and BAT2 are discharged at S22, the SOC1 is almost equal to the SOC2 before the battery discharge is started at S25.

After S25, the contact welding detection process proceeds to S26 where the ECU 13 determines whether the absolute value of the difference between the SOC1 and the SOC2 is not less than the threshold value SOCr. Since the relay RB2 is turned ON at S24, the battery BAT2 is surely discharged. On the other hand, since the relay RB1 is kept OFF, the battery BAT1 is not discharged unless the relay RB1 suffers from the contact welding. Therefore, if the relay RB1 does not suffer from the contact welding, the battery BAT2 is discharged without the battery BAT1 being discharged, so that the absolute value of the difference between the SOC1 and the SOC2 is not less than the threshold value SOCr.

If the ECU 13 determines that the absolute value of the difference between the SOC1 and the SOC2 is not less than the threshold value SOCr corresponding to YES at 626, the contact welding detection process proceeds to S33 where the ECU 13 determines that the relay RB1 does not suffer from the contact welding. In other words, at S33, the ECU 13 determines that only the relay RB2 suffers from the contact welding. FIG. 5 shows this case. Then, the ECU 13 performs a diagnostic process at S34, and then the contact welding detection process proceeds to S29.

If the ECU 13 determines that the absolute value of the difference between the SOC1 and the SOC2 is less than the threshold value SOCr corresponding to NO at S26, the contact welding detection process proceeds to S27. In this case, the relay RB1 suffers from the contact welding. Further, the ECU 13 determines that the relay RB2 suffers from the contact welding at the time the contact welding detection process proceeds to S24. Therefore, the ECU 13 determines that both the relays RB1 and RB2 suffer from the contact welding at S27 and performs diagnostic process at S28. FIG.

6 shows this case. Then, at S29 (t18), the ECU 13 turns OFF the relays RG and RB2, and then the contact welding detection process is ended.

As described above, according to the first embodiment, the ECU 13 detects contact welding occurring in any of the relays RB1 and RB2 included in the power systems PS1 and PS2 and also identifies which of the relay RB1 and the relay RB2 suffers from the contact welding. Since the ECU 13 detects an increase in the voltage VH by turning ON the pre-charge relay RP, the ECU 13 can detects contact welding occurring in the relays RB1 and RB2 while preventing inrush current from occurring.

To control charge and discharge states of the batteries BAT1 and BAT2, the ECU 13 has a configuration capable of measuring the SOCs of the batteries BAT1 and BAT2 even when contact welding occurs. The ECU 13 detects the changes in the states of the batteries BAT1 and BAT2 based on the SOCs when identifying the relay suffering contact welding. Therefore, the ECU 13 can identify the relay suffering contact welding without using additional sensors or the like.

The ECU 13 determines whether the states of the batteries BAT1 and BAT2 change after performing the battery discharge by comparing the absolute value of the difference between the SOC1 and the SOC2 with the threshold value SOCr. Thus, the ECU 13 can correctly detect a difference in change between the states of the batteries BAT1 and BAT2, even when the remaining power before the battery discharge is performed at S22 or S25 varies between the batteries BAT1 and BAT2 and the discharged power during the battery discharge varies between the batteries BAT1 and BAT2.

The ECU 13 performs the battery discharge by driving the electrical load (e.g., the inverters 12 and 21, the DC/DC converter 19) connected to the batteries BAT1 and BAT2. In such an approach, there is no need to use a special electrical load for the discharge purpose. As long as the MG 11 can be driven when the battery discharge is performed at S22 or S25, the ECU 13 can proceed with the contact welding detection process until the user, who was cautioned about the contact welding, drives the vehicle to a car dealer shop, a car repair shop, or the like.

Second Embodiment

Figure 7:
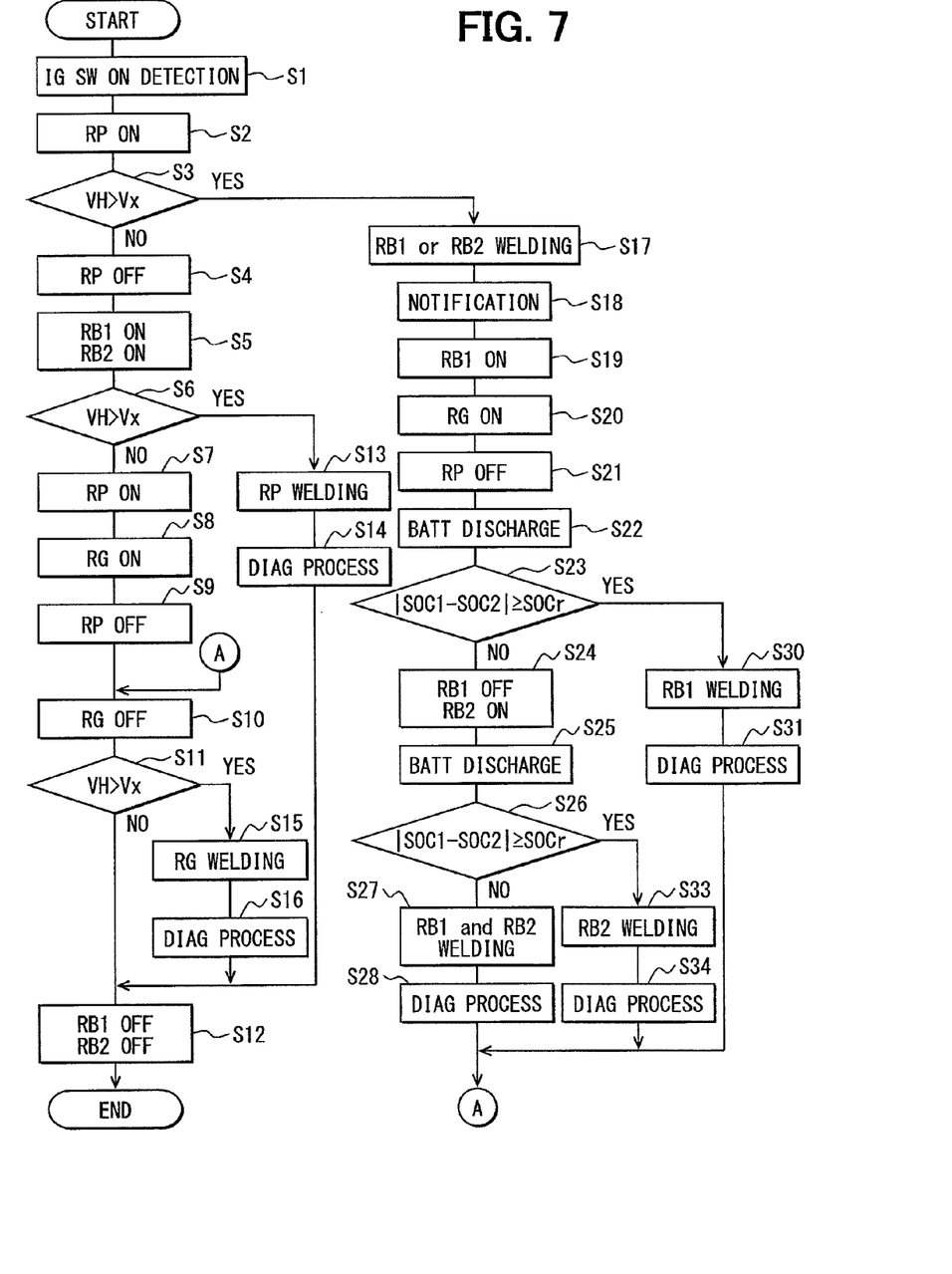
FIG. 7 is a flowchart of a contact welding detection process according to a second embodiment of the present disclosure.

A second embodiment of the present disclosure is described below with reference to FIG. 7. A main circuit of a power drive system according to the second embodiment has the same structure as the main circuit described in the first embodiment. FIG. 7 shows a contact welding detection process according to the second embodiment. Differences between the first and second embodiments are as follows.

Like in the first embodiment, the ECU 13 identifies which of the relays RB1 and RB2 suffers from the contact welding (S27, S30, or S33). Then, the contact welding detection process proceeds to S10 through the diagnostic process (S28, S31, or S34). At S10, the ECU 13 determines whether the relay RG suffers from the contact welding. Thus, according to the second embodiment, contact welding in the relay RG caused when the relay RG is turned ON and OFF at S20 and S10 can be detected.

Third Embodiment

Figure 8:
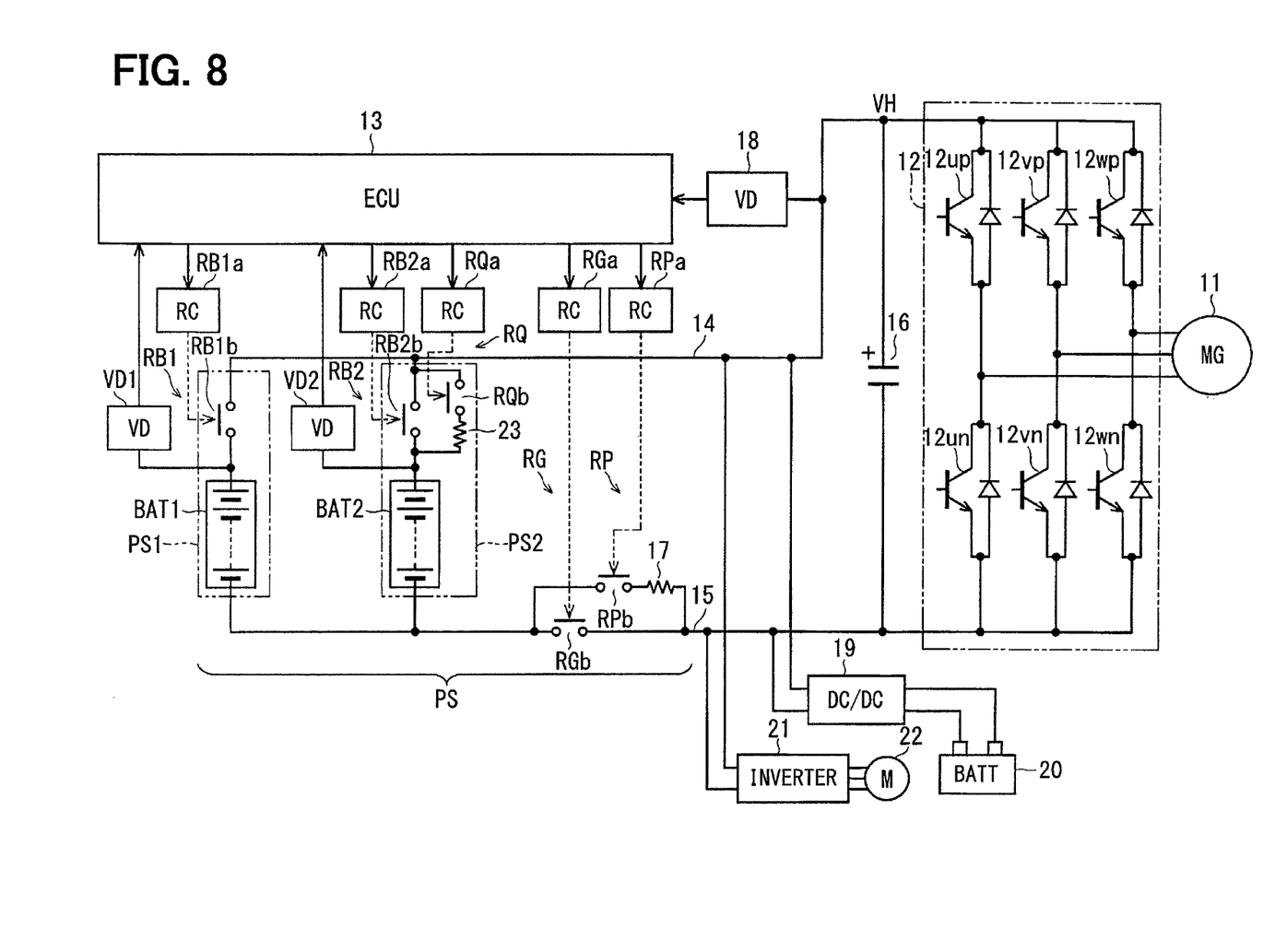
FIG. 8 is a diagram illustrating a structure of a main circuit of a power drive system according to a third embodiment of the present disclosure.

A third embodiment of the present disclosure is described below with reference to FIG. 8. FIG. 8 shows a structure of a main circuit of a power drive system according to the third embodiment. Differences in the structure of the main circuit between the first and third embodiments are as follows. A series circuit of a resistor 23 and a contact RQb of a pre-charge relay RQ is connected in parallel to the contact RB2b. The contact RQb is closed when a coil RQa of the relay RQ is energized. The relay RQ and the resistor 23 are included in the power source PS. Alternatively, the series circuit of the resistor 23 and the contact RQb is connected in parallel to the contact RB1b instead of the contact RB2b.

In normal times, the ECU 13 turns ON the relay RP before turning ON the relays RB1 and RB2. Thus, a charge current flows to the capacitor 16 through the resistor 17, so that inrush current does not occur. In contrast, when the ECU 13 detects contact welding in the relay RG, the ECU 13 turns ON the relay RQ before turning ON the relays RB1 and RB2. Thus, a charge current flows to the capacitor 16 through the resistor 23, so that inrush current does not occur. That is, even when contact welding occurs in the relay RG, the batteries BAT1 and BAT2 can be connected to the electrical load such as the inverter 12 while preventing inrush current from occurring.

When the relay RP or the relay RQ suffers from the contact welding, the ECU 13 cautions a user about contact welding. Even in this case, the batteries BAT1 and BAT2 can be connected to the electrical load such as the inverter 12 by closing the contact RGb connected in parallel to the contact RPb suffering contact welding or by closing the contact RB1b or RB2b connected in parallel to the contact RQb suffering contact welding. Thus, power supply from the batteries BAT1 and BAT2 to the electrical load can be achieved without through the resistors 17 and 23.

Modifications

While the present disclosure has been described with reference to the embodiment, it is to be understood that the disclosure is not limited to the embodiment. The present disclosure is intended to cover various modifications and equivalent arrangements within the spirit and scope of the present disclosure.

For example, the power source PS can include three or more power systems PSn (n=1, 2, 3, . . . ) which are connected in parallel between the power wires 14 and 15. For example, when the ECU 13 detects that contact welding occurs in at least one of the power systems PS1, PS2, and PS3, the ECU 13 performs the battery discharge by turning ON the relay RB1 while keeping the remaining relays RB2 and RB3 OFF.

At this time, if contact welding occurs in the relay RB3, the states of the batteries BAT1 and BAT3 change due to the battery discharge, but the state of the battery BAT2 remains unchanged. Therefore, the ECU 13 can determine that the relay RB2 does not suffer from the contact welding, but the relay RB3 suffers from the contact welding. Then, the ECU 13 performs the battery discharge by turning ON the relay RB3 while keeping the remaining relays RB1 and RB2 OFF.

At this time, if contact welding occurs in the relay RB1, the states of the batteries BAT1 and BAT3 further change due to the battery discharge. Therefore, the ECU 13 can determine that the relay RB1 suffers from the contact welding. In contrast, if contact welding does not occur in the relay RB1, the state of only the battery BAT3 changes due to the battery discharge. In this way, the ECU 13 identifies which of the relays RBn (n=1, 2, 3, . . . ) suffers from the contact welding by turning ON each of possible main relays in turn while turning OFF the others of the possible main relays. The possible main relay is defined as having a possibility of suffering from the contact welding.

The states of the batteries BAT1 and BAT2 can be direct voltages instead of the SOCs. In such a configuration, calculation processing on the state values can be made unnecessary, since the voltages detected by the voltage detectors VD1 and VD2, and voltage data obtained by a battery monitor unit (not shown) can be used directly. In this case, it is determined whether an absolute value of a difference between a voltage V1 of the battery BAT1 and a voltage V2 of the battery BAT2 after the battery discharge is not less than a threshold value Vr. If the absolute value of the difference between the voltage V1 and the voltage V2 is not less than the threshold value Vr, a relay driven to be OFF does not suffer from the contact welding. In contrast, if the absolute value of the difference between the voltage V1 and the voltage V2 is less than the threshold value Vr, the relay driven to be OFF suffers from the contact welding. Alternatively, both the SOCs and the voltages can be used as the states of the batteries BAT1 and BAT2.

The determination made at S23, S26 can be based on a change in the state of the relay driven to be OFF between before and after the battery discharge. Assuming that the relay RB1 having the contact RB1$b$ connected in series to the battery BAT1 is driven to be OFF, if an absolute value of a difference in the state of the battery BAT1 between before and after the battery discharge, it can be determined that the relay RB1 does not suffer from the contact welding. Whether or not the relay RB2 driven to be OFF suffers from the contact welding can be determined in the same manner as the relay RB1. The states can be the SOCs and/or the voltages as described above.

When the vehicle is in car dealer shop, a car repair shop, or the like, a battery charge can be performed at S22, S25 instead of the battery discharge by using an external power supply. For example, when a remaining capacity of a battery is small, the state of the battery can be changed to a level sufficient for the contact welding determination by charging the battery. A time necessary for the determination can be reduced by using an external quick charger.

In the third embodiment, a series circuit of a resistor and a contact of a pre-charge relay can be connected in parallel to each of the contact RB1$b$ of the relay RB1 and the contact RB2$b$ of the relay RB2.

Such changes and modifications are to be understood as being within the scope of the present invention as defined by the appended claims.

What is claimed is:

1. A control apparatus for a power-supply apparatus, the power-supply apparatus including a plurality of power-supply systems connected in parallel between a pair of power wires connected to an electrical load, each power-supply system having a series circuit of a battery and a contact of a main relay provided for the battery, the control apparatus comprising a controller configured to determine whether at least one of the plurality of main relays suffers from a contact welding, wherein:

when the controller determines that the at least one of the plurality of main relays suffers from the contact welding, the controller performs a battery charge/discharge process to charge/discharge the plurality of batteries through the pair of power wires by turning ON one of possible main relays out of the plurality of main relays while turning OFF the others of the possible main relays, each possible main relays defined as having a possibility of suffering from the contact welding, after the battery charge/discharge process, the controller performs an identification process to identify which possible main relay actually suffers from the contact welding based on a change in a state of the battery connected in series with the contact of each possible main relay, the controller repeatedly performs the battery charge/discharge process and the identification process by turning ON each of the possible main relays in turn while turning OFF the others of the possible main relays, the plurality of power-supply systems includes a first power-supply system and a second power-supply system, when the controller determines that the main relay of at least one of the first power-supply system and the second power-supply system suffers from the contact welding, the controller determines whether the main relay of the first power-supply system suffers from the contact welding by performing the battery charge/discharge process by turning ON the main relay of the first power-supply system, and when the controller comes to no conclusion on whether the main relay of the first power-supply system suffers from the contact welding after the battery charge/discharge process, the controller determines whether the main relay of the first power-supply system suffers from the contact welding by performing the battery charge/discharge process by turning ON the main relay of the second power-supply system.

2. The controller according to claim 1, wherein the state of the battery is at least one of a voltage of the battery and a state of charge of the battery.

3. The controller according to claim 1, wherein after the battery charge/discharge process, the controller determines whether an absolute value of a difference between the state of the battery connected in series with the contact of the one of the possible main relays and the state of the battery connected in series with the contact of one of the others of the possible main relays is not less than a predetermined threshold value, and when the absolute value is not less than the predetermined threshold value, the controller determines that the one of the others of the possible main relays does not suffer from the contact welding.

4. The controller according to claim 1, wherein the controller determines whether an absolute value of a difference in the state of the battery connected in series with the contact of one of the others of the possible main relays between before and after the battery charge/discharge process is not less than a predetermined threshold value, and when the absolute value is less than the predetermined threshold value, the controller determines that the one of the others of the possible main relays does not suffer from the contact welding.

5. The controller according to claim 1, wherein the power-supply apparatus has a contact of a common relay and a series circuit of a first resistor and a contact of a first pre-charge relay, the contact of the common relay is provided in the pair of power wires so that the common relay is capable of connecting and disconnecting the plurality of power-supply systems to and from the electrical load, the series circuit of the first resistor and the contact of the first pre-charge relay is connected in parallel to the contact of the common relay, the controller determines whether a voltage between the pair of power wires increases by turning OFF all the plurality of main relays while turning ON the first pre-charge relay, and when the voltage increases, the controller determines that at least one of the plurality of main relays suffers from the contact welding.

6. The controller according to claim 1, wherein the controller discharges the plurality of batteries in the charge/discharge process by using the electrical load.

7. The controller according to claim 1, wherein the controller charges the plurality of batteries in the charge/discharge process by using an external power source.

8. A controller for a power-supply apparatus, the power-supply apparatus including a plurality of power-supply systems connected in parallel between a pair of power wires connected to an electrical load, each power-supply system having a series circuit of a battery and a contact of a main relay provided for the battery, the control apparatus comprising a controller configured to determine whether at least one of the plurality of main relays suffers from a contact welding, wherein:

when the controller determines that the at least one of the plurality of main relays suffers from the contact welding, the controller performs a battery charge/discharge process to charge/discharge the plurality of batteries through the pair of power wires by turning ON one of possible main relays out of the plurality of main relays while turning OFF the others of the possible main relays, each possible main relays defined as having a possibility of suffering from the contact welding, after the battery charge/discharge process, the controller performs an identification process to identify which possible main relay actually suffers from the contact welding based on a change in a state of the battery connected in series with the contact of each possible main relay, the power-supply apparatus has a contact of a common relay and a series circuit of a first resistor and a contact of a first pre-charge relay, the contact of the common relay is provided in the pair of power wires so that the common relay is capable of connecting and disconnecting the plurality of power-supply systems to and from the electrical load, the series circuit of the first resistor and the contact of the first pre-charge relay is connected in parallel to the contact of the common relay, the controller determines whether a voltage between the pair of power wires increases by turning OFF all the plurality of main relays while turning ON the first pre-charge relay, when the voltage increases, the controller determines that at least one of the plurality of main relays suffers from the contact welding, the power-supply apparatus has a series circuit of a second resistor and a contact of a second pre-charge relay, the series circuit of the second resistor and the contact of the second pre-charge relay is connected in parallel to the contact of the main relay of at least one of the plurality of main relays, and when the common relay suffers from the contact welding, the controller prevents occurrence of an inrush current by turning OFF all the plurality of main relays while turning ON the second pre-charge relay.

9. A control apparatus for a power-supply apparatus, the power-supply apparatus including a plurality of power-supply systems connected in parallel between a pair of power wires connected to an electrical load, each power-supply system having a series circuit of a battery and a contact of a main relay provided for the battery, the control apparatus comprising:

a controller configured to determine whether at least one of the plurality of main relays suffers from a contact welding, wherein:

when the controller determines that the at least one of the plurality of main relays suffers from the contact welding, the controller performs a battery charge/discharge process to charge/discharge the plurality of batteries through the pair of power wires by turning ON a first possible main relay out of the plurality of main relays while turning OFF a second possible main relay other than the first possible main relay and out of the plurality of main relays, each of the first and second possible main relays defined as having a possibility of suffering from the contact welding, after the battery charge/discharge process, the controller determines whether an absolute value of a difference between a first state of a first battery connected in series with the contact of the first possible main relay and a second state of a second battery connected in series with the contact of the second possible main relay in the power-supply systems connected in parallel between the pair of power wires is not less than a predetermined threshold value, and when the absolute value is not less than the predetermined threshold value, the controller determines that the second the possible main relays does not suffer from the contact welding.

* * * * *